June 8, 1965     O. G. DALTON ETAL     3,187,608

METHOD FOR FORMING ARTICLES

Filed Dec. 4, 1961

INVENTORS:
RICHARD K. MAY
JESSIE L. McDANIEL
ORAN G. DALTON
BY
ATTORNEYS

United States Patent Office 3,187,608
Patented June 8, 1965

3,187,608
METHOD FOR FORMING ARTICLES
Oran G. Dalton, Jessie L. McDaniel, and Richard K. May, Fort Worth, Tex., assignors to General Dynamics Corporation, San Diego, Calif., a corporation of Delaware
Filed Dec. 4, 1961, Ser. No. 156,684
4 Claims. (Cl. 76—108)

This invention relates to the forming of articles such as cutting tools and more particularly, to method and apparatus for the forming and resizing of articles such as cutting tools which are particularly well adapted for utilizing high energy apparatus as force applying means.

It has heretofore been the usual practice to form articles such as cutting tools from stock by machining operations which involve the removal of a substantial amount of metal in the shaping of the tool cutting teeth and in the defining of other geometrical features of the tool. This procedure is not only wasteful of material but it is also time consuming and accordingly expensive. It has the further serious drawback of producing articles such as cutting tools of inferior strength and durability. This is the result of grain end exposure occurring when the cutting teeth are machined transversely of the grain flow of the stock material and is particularly pronounced in the case of tools having helical teeth or helical flute cutters. Sharp corners occur in the change of direction areas of the machining cuts and these corners act as stress risers in subsequent heat treating of the tools and in tool use wherein the tool is called upon to sustain forces acting transversely of the grain flow, a direction of weaker strength. This further degrades the physical properties of the tools and their ability to resist shock and fatigue.

The apparatus and method of this invention have as an objective the provision of articles such as cutting tools, particularly those adapted for shank and arbor mounting, which eliminate the above undesirable characteristics of machined tools by forming the tools so that the grain flow generally parallels the cutting teeth, reducing areas of stress rise, presenting maximum strength in the direction of those stresses sustained during cutting operations and thereby producing greater resistance to chipping of the cutter teeth. It should be noted that the teachings of this invention have applicability both to the initial forming of articles such as cutting tools and to their resizing after use. The apparatus and process contemplate forming of the articles such as cutting tools oversize, with grinding generally necessary only to effect close tolerance mounting surfaces and the clearance angles of article geometry. An article is in effect, born to shape, with a minimum requirement for subsequent removal of material. No grain ends appear along the surfaces of the cutting teeth and a continuous grain flow is produced in areas where there occur changes in the geometry of the article. In addition to orienting the grain of the article material for maximum effectiveness, the invention provides an article with a refined granular structure, thus improving the article strength characteristics.

In addition to the above, the invention has as an object the provision of an apparatus and process which will permit the ready forming of a wide variety of materials which are difficult or impossible to satisfactorily machine.

A further object is the provision of an apparatus and process which are adapted to utilize high energy rate force-imparting means to achieve excellent material flow and accurate extrusion forming.

Another object of the invention is to provide apparatus of simple and rugged structure which is capable of sustained operation to produce improved articles such as cutting tools at a reduced cost of material, time and man-hours.

Other objects and advantages of this invention will become apparent from the following description when taken in conjunction with the drawings, in which.

Generally described, the illustrated embodiment of the invention contemplates the forming of cutting tools or cutters having helically shaped teeth by means of a punch receivable within a helically fluted die cavity. The die cavity, which is somewhat oversize to permit grinding of the cutter blank to final size, is open to reception of the punch on one end, and is closed by means of an ejection or knockout tool at the other end. This tool is provided with one or more ribs or threads of helical shape similar to and mateable with the die cavity flute or flutes. For the forming operation, the ejection means or tool is positioned within the die to effect its end closure, thereby to determine the length of the cutter blank and its end configuration. Subsequently the ejection means serves to eject the formed cutter tool blank from the die as it twists through the die cavity. High energy rate apparatus have been found particularly satisfactory as driving means for the punch. By high energy rate apparatus is meant apparatus capable of applying a force of from approximately 100,000 to 300,000 p.s.i. at an initial velocity of approximately 740 inches per second. It is important that the billet of metal moving through the die under influence of the punch be extrusion-formed in order to achieve the aforementioned salutary grain flow. Heating of the billet prior to forming is effected to aid in achieving this flow. As extruded, the cutter tool blank requires but a minimum of additional work, as by grinding, to shape its cutting tip and shank geometry, the latter to satisfy the requirements of the particular cutter tool application desired. This grinding can be further assisted by suitably shaping a protuberance on the end of the tool, as will be mentioned hereinafter.

After use, cutter tools become worn and chipped. Regrinding to resharpen the tool causes a reduction of the tool diameter. Since the tolerance with respect to this diameter is often critical, particularly in the case of programmed automatic milling machines, the cutters become unusable after a limited number of grinding operations. However, through practice of the teachings of this invention, these unusable cutters may be resized and again made usable. The process involves heating the used cutter tool and placement of same in a die having a cavity shaped to define the desired cutter tool configuration. Punch means are forced by ram means against the heated cutter tool positioned within the die to effect its upset and an increase in the tool diameter to that of the die cavity, which latter is sufficiently oversize to permit subsequent grinding of the blank to produce the finished cutter. Approximately the same amount of grinding after the formation of the blank is required to finally shape the tool as is required incident to initial make-up of the cutter tool, generally described above.

Figure 1:
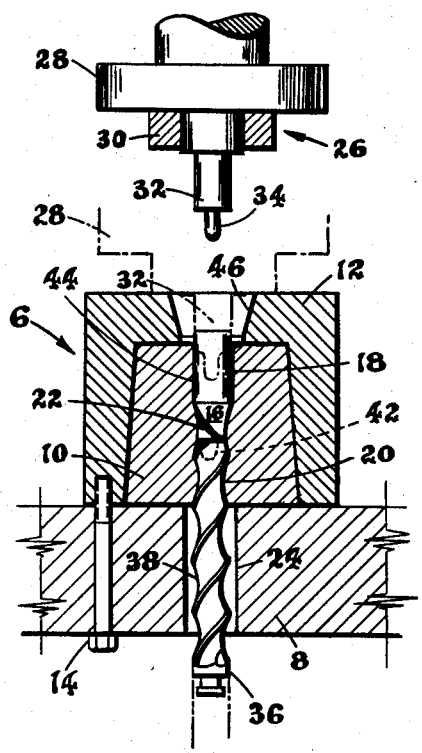
FIGURE 1 is a plan view of an embodiment the apparatus with the die shown in horizontal section, the punch being illustrated by way of solid outline in a retracted position prior to reception within the die, and by means of broken line outline after extension and reception within the die to induce forming of the cutter blank.
Figure 2:
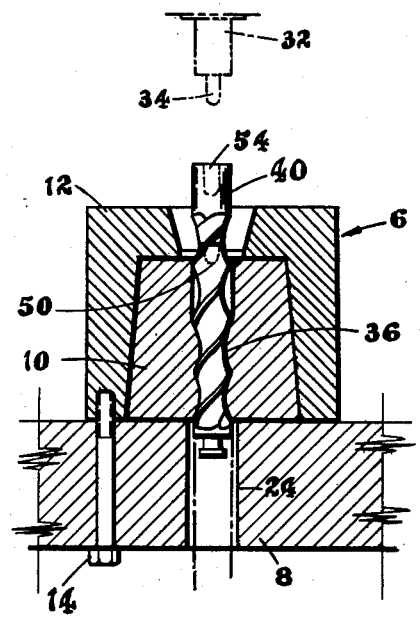
FIGURE 2 is a view similar to that of FIGURE 1, with the cutter blank shown after formation and during ejection from the die by the ejector means.

Turning now to the drawing and a detailed description of the invention, there is shown in FIGURE 1 a die, generally designated by the numeral 6, comprised of a bolster plate 8 upon which a die block 10 is mounted by means of a hold down plate 12 and attachment bolts 14, only one of which is illustrated. Die block 10 is provided with an axially disposed cavity 16 of slightly greater dimension than the final cutter and having a first or outer portion 18 of generally smooth bore and a second or inner portion 20 having a pair of helically shaped flutes 22. As is illustrated in FIGURES 1 and 2, die 6 is so mounted upon bolster plate 8 as to axially align die cavity 16 with a smooth bore cavity 24 which is provided in the bolster plate and which is of greater diameter than the die cavity. The die block should of course be made of a high quality tool steel and the remaining die parts of a high strength tough material. It should be understood that the die 6 may assume a variety of configurations insofar as hold down plate 12 and the external configuration of the die block 10 are concerned. It is, however, important that the cutter tool forming cavity be generally aligned with the cavity 24 provided in the bolster to permit the indicated travel of the knock-out tool.

In FIGURE 1 the punch means, generally designed 26, is shown mounted upon force-imparting actuating means 28, which latter is preferably a high energy rate ram capable of driving the punch means at a velocity of approximately 740 inches per second and of imparting a pressure to the billet undergoing extrusion of from approximately 100,000 to 300,000 p.s.i. As shown in FIGURE 1, actuating means 28 and punch means 26 are retracted. Punch means 26 is comprised of a cylindrically shaped stop block 30 which embraces the end of elongated cylindrical punch 32, the latter carrying at its exposed extremity a protuberant punch tip 34 of convex shape. Provision of the tip 34 is optional; however, it is useful in the subsequent grinding operation, as will presently be explained.

A knock-out tool 36, serving as the formed cutter-blank ejection means, is disposed for axial movement through aperture 24 and die cavity 16, being provided with a pair of ribs or threads 38 shaped helically to mate with the similarly shaped pair of flutes 22 in the die cavity. The threads 38 permit to tool to twistably move through the cavity from the position of die cavity closure and cutter-blank forming of FIGURE 1 to the position of ejection of the completed cutter-blank 40 shown in FIGURE 2.

It is important that the inner end of the die cavity be closed during forming of the cutter-blank 40 and therefore that the knock-out tool ribs 38 be received in rather close fitting relationship within the flutes 22, at least at the outer face of the knock-out tool in the area of cutter-blank end forming. Because of the high pressures built up during forming, die fracture may be a problem. Such fracture may, however, be prevented by permitting a metered flow of the plasticized billet material past the knock-out tool 36 intermediate the cavity flutes and the mating knock-out pin threads. A cavity 42 of frustoconical shape may be provided at the outer or cavity closing end of the tool for the forming of a protuberant portion upon the cutter tool to facilitate grinding to final shape. Further, inasmuch as forces against the knock-out pin will develop compressive stress therein, the non-forming end of the pin may be expanded in design to reduce these compressive stresses. Actuating means (not shown) serve to move the tool 36 through aperture 24 and die cavity 16.

Describing now the operational steps of forming the cutters, a billet 44 is made up from round bar stock of suitable diameter. Good results have been obtained using T-1 high speed tool steel the composition of which is as follows: carbon .72%, manganese .25%, silicone .20%, tungsten 18.25%, chromium 4.00% and vanadium 1.15%. Other suitable materials may, however, be used. The billet should be of a volume somewhat greater than that of the finished cutter tool in order to allow for finish grinding, including removal of protrusions at the inner end of the cutter. The diameter of the billet should be sufficient to assure extrusion forming of the billet in order to achieve the beneficial grain flow heretofore mentioned. By extrusion forming, is meant the forcing of billet flow under sufficient pressure and with sufficient speed to achieve plastic flow of the billet material through the fluted die cavity to impart to the billet, cutter teeth of a helical shape similar to the shape of the cavity flutes. This is well provided through use of high energy rate ram actuating means for the punch. It is preferable that the billet be suitably heated to a point below its melting point to render the material susceptible to plastic flow and extrusion forming. For T-1 steel, maximum billet pre-heat will range from about 2100° to about 2350° F. To further facilitate forming, it is preferable that a die lubricant be used and for this purpose silicone base lubricants have been found satisfactory.

As shown in FIGURE 1, the heated billet 44 is placed in the die block cavity 16 with the knock-out tool 36 positioned as indicated to close the cavity, defining the length of the cutter blank and its end configuration. The die may be heated if the die material is of a hot worked type tool steel; but this is optional. Where heated, a preferred temperature range is from 400° to 700° F. However, forming of the billet should be undertaken immediately after billet heating in order that the billet not be substantially cooled by conduction of heat through the die and away from the billet. The high velocity ram means utilized herein facilitates the needed rapid application of a forming force prior to such billet cooling.

In forming the billet 44, the ram forces the punch inwardly at high velocity for reception with in the die cavity 16 and impact with the billet. As already indicated, it is desirable that the ram actuating means be of a high energy rate type. For the forming of cutter tools from T-1 steel, excellent results have been achieved using ram means capable of an energy output of approximately 538,000 in.-lb. Forming was accomplished using a total ram stroke of 11 inches, including the metal working or billet forming stroke which was approximately 2 inches. The energy at contact was approximately 497,000 in.-lb. with the ram and punch moving at an approximate velocity of 740 inches per second. Total weight of the ram, punch and the moving parts and weights associated therewith, was approximately 770 lbs. The high energy rate ram actuating means assures excellent plastic flow of the billet material during the forming operation, which terminates as the punch means moves into the position shown in FIGURE 1 in broken outline, with the stop block 30 abutting the outer surface of hold down plate 12. An outwardly flared aperture 46 is provided in plate 12 to receive the enlarged end portion of punch means 26. As the billet 44 is forced through the die cavity, it is extrusion-formed in the fluted second or inner cavity portion 20 to define the helical cutting teeth 48. The length of the cutter blank, as well as its cutting end configuration, is defined by the knock-out tool 36, the cavity 42 therein serving to shape a frusto-conical protuberance 50 in the cutting end. That portion of the billet filling the inner portion 18 of the die cavity defines the smooth wall cylindrical shank portion of the cutter and the punch tip 34 forms a concavity 54 positioned axially of the shank outer end. Upon completion of the forming operation, the punch means is retracted and the formed cutter blank is cooled to permit its ejection from the die cavity which latter, as shown in FIGURE 2, is accomplished by means of the knock-out tool 36. Thus tool 36 is caused to twistably move through the die cavity 16 with guidance provided by ribs 48 tracking in die flutes 22.

Figures 3, 4:
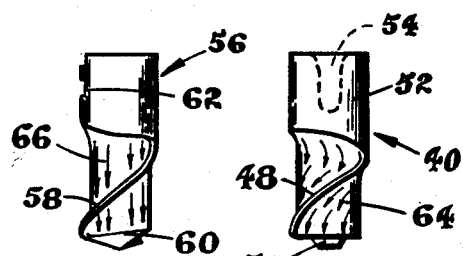
FIGURES 3 and 4 are views in side elevation, respectively showing tools conventionally formed by machining, and by the apparatus and process of this invention, the arrows indicating the direction of grain flow in each tool.

In FIGURE 2, the cutter blank 40 is shown in a position ready for removal from the die and subsequent grinding to final shape. The cutter blank is also shown in FIGURE 4 in a similar state ready for final grinding. Such grinding is accomplished utilizing the axially disposed concavity 54 and the protuberance 50 located at opposite ends of the blank. The protuberance 50 not only facilitates the grinding operation but permits shaping of the cutting end of the cutter merely by the removal of a minimum amount of material. Concavity 54 may assume a variety of shapes depending upon grinding requirements and ultimate mounting requirements for the use of the finished cutter.

FIGURES 3 and 4, respectively, present a comparison between the grain flow in cutters formed by conventional machining methods and by the method of this invention. A conventional cutter 56 is illustrated as having helical cutting teeth 58 in its cutting portion 60 and a notched shank portion 62 for mounting of the cutter, as in a milling machine. The arrows 64 and 66 upon the cutting portions of each of the cutters 40 and 56 indicate the direction of grain flow. It is readily apparent that the sharp angular corners with attendant grain end exposure and stress rise are virtually eliminated in the cutter tools produced by this invention, being replaced by a smooth granular flow paralleling the direction of the helical cutter teeth 48.

Figure 5:
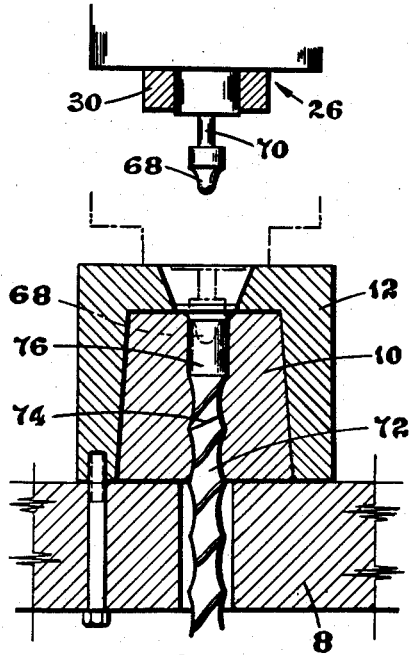
FIGURE 5 is a view in horizontal section of the apparatus of the invention utilized in resizing used cutter tools.

In FIGURE 5 is shown the apparatus used to resize cutters after use. This apparatus is identical with that shown in FIGURES 1 and 2, except for the enlarged protuberant tip 68 provided at the exposed extremity of a slightly modified punch 70 and the knockout tool 72 shaped at its inner or forming end 74 to mateably receive the cutting tip of the used cutter tool 76. The cavity provided within die block 10 is of somewhat greater dimension that the finished cutter tool 76 to permit grinding of the tool to final dimension after resizing. The used tool 76 will of course be considerably smaller than the cavity, depending upon the amount of wear. The punch tip 68 serves to displace material from the shank end of the used cutter tool causing tool material to flow outwardly into conformity with the die cavity walls. The size of the tip will accordingly vary with the extent of wear of the tool and the amount of metal displacement required. In any event, the cutter blank is formed somewhat oversize to permit of subsequent removal of material by grinding to achieve the final cutter geometry.

In resizing, the used cutter tool 76 is first heated to a temperature just below its melting point and sufficiently high to render the cutter tool material plastic and susceptible to flow within the die. The heated tool 76 is then placed within the die 10, heating of which latter is optional. The punch is thereupon immediately impacted against the plasticized cutter tool before the latter cools, the tool being forced into conformity with the die cavity walls by the displacing action of the tip 68. A high energy punch or ram means is preferably employed in effecting the resizing of the used cutter tool. After the forming operation is completed, the punch is withdrawn from the die and the resized cutter tool is allowed to cool. Removal is then effected in the manner previously described for the forming of new cutter tools, with the knockout tool spiralling outward to force the cutter blank from the die. The blank is finally ground to a finished configuration in the manner described above for the initial forming of a cutter tool, with the exception that a lesser amount of material will be removed from the cutter tool cutting extremity as a result of the proximity of the shape of the resized cutter to that of the cutter tool ultimate shape.

Although the invention has been described with respect to certain of its preferred embodiments, it is to be understood that it may be altered, changed or modified within the scope and spirit of the appended claims.

We particularly point out and distinctly claim as our invention:

1. A method of high energy forming comprising the steps of:
heating a billet of material to a temperature sufficiently high to render same susceptible to plastic flow;
placing the heated billet in one portion of a die cavity having an adjustable substantially closed one end, for adjustably providing a desired volume within the cavity and a desired end configuration of the article to be formed, and open to entry of punch means at the other end;
by punch means driven in movement toward the substantially closed end against the billet applying to the billet a pressure sufficiently high to effect and maintain the plastic flow of the material within the cavity such that the material is moved from the one portion of the die through the die cavity and caused to abut the cavity closed end and caused to conform accurately with the die cavity to produce the desired end configuration; and
moving the substantially closed end of the die cavity for removing the formed article from the die cavity.

2. The method of shaping articles in a die cavity having an adjustable substantially closed end comprising the steps of:
adjusting the substantially closed end of the die cavity for providing a desired configuration and volume therein;
placing a billet of material to be shaped in one portion of the die cavity;
pressing a punch against an end of the billet to pierce at least a portion of the billet end and to move the billet from the one portion of the cavity through the die cavity to abut the substantially closed end of the cavity thereby shaping the billet into conformity with the die cavity;
retracting the punch; and
moving the substantially closed end of the die cavity for removing the shaped article from the die cavity while maintaining the cross-sectional configuration of the die cavity.

3. A method for the high energy rate extrusion forming of cutters having salutary grain flow comprising the steps of:
heating a billet of material to a temperature sufficiently high to render same susceptible to plastic flow;
placing the heated billet in a die cavity having helically fluted side walls, an adjustable substantially closed one end for adjustably providing a desired volume within the die cavity and a desired end configuration of the cutters to be formed, and open to entry of punch means at the other end;
driving punch means into the die cavity in the direction of the cavity closed end against the billet at a high rate to impose a pressure upon the billet sufficiently high to initiate and maintain the plastic flow of the billet material thereby to cause same to flow longitudinally of said flutes into abutment with the cavity closed end and accurate conformity with the cavity configuration and to produce a strength-imparting grain structure to the thus formed cutter due to the salutary grain flow; and,
moving the substantially closed end of the die cavity for removing the thus formed cutter from the die cavity while maintaining the cross-sectional configuration of the die cavity.

4. A method for the high energy rate extrusion forming of cutters comprising the steps of:
heating a billet of material to a temperature sufficiently high to render same susceptible to plastic flow;
placing the billet in a helically fluted die cavity having an adjustable substantially closed one end, for providing a predetermined volume within, and the end configuration of, the die cavity, and open to entry of punch means at the other end;
driving punch means having a protruding end portion into the die cavity in a direction of the cavity closed end against said billet at a high rate to impose a pressure upon the billet sufficiently high to initiate and maintain the plastic flow of the billet material thereby to cause same to flow longitudinally of the flutes into abutment with the cavity closed end and to cause the billet material to accurately conform with the cavity configuration and by the punch means protruding end portion to shape an indentation on the end of the formed cutter contacted thereby;

moving the substantially closed end of the die cavity for removing the thus formed cutter blank from the die cavity while maintaining the cross-sectional configuration of the die cavity; and, upon cooling, grinding the thus formed blank to produce the said cutter.

References Cited by the Examiner

UNITED STATES PATENTS

| | | | |
|---|---|---|---|
| 2,034,514 | 3/36 | Hayden et al. | 76—108 |
| 2,345,100 | 3/44 | Cotton | 76—108 X |
| 2,457,132 | 12/48 | Delaney | 76—108 |
| 2,526,489 | 10/50 | Liddicoat | 76—108 |
| 2,764,042 | 9/56 | Gotze. | |
| 2,904,173 | 9/59 | Braun et al. | 207—6 |
| 2,954,121 | 9/60 | Benson | 207—6 |

FOREIGN PATENTS 129,913   4/02   Germany.

GRANVILLE Y. CUSTER, Jr., *Primary Examiner.*

FRANK H. BRONAUGH, *Examiner.*